(No Model.) 3 Sheets—Sheet 1.
B. A. GRUHL.
APPARATUS FOR SHAPING DESIGNS ON BLOWN GLASS.
No. 541,851. Patented July 2, 1895.
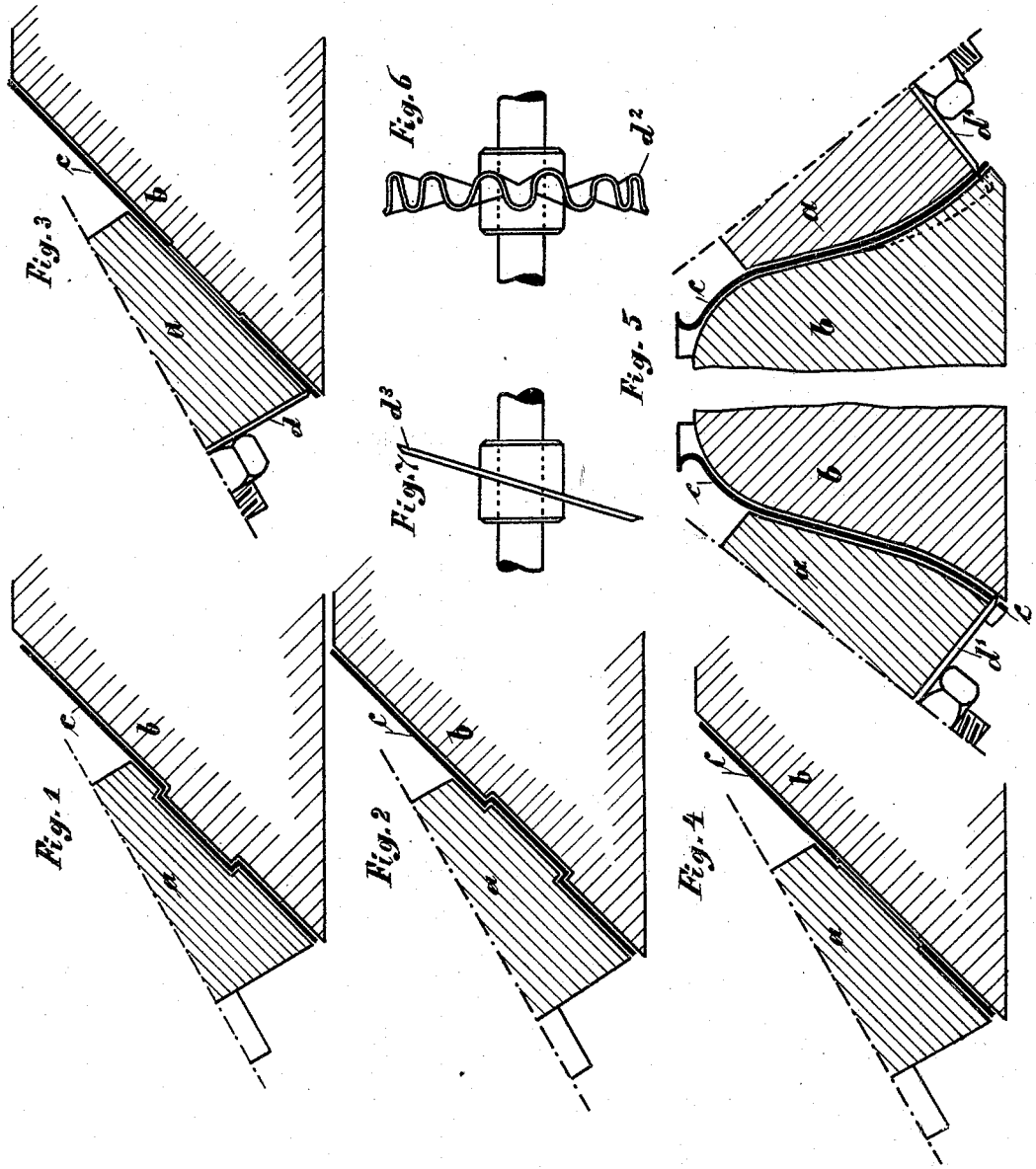

(No Model.) 3 Sheets—Sheet 2.

B. A. GRUHL.
APPARATUS FOR SHAPING DESIGNS ON BLOWN GLASS.

No. 541,851. Patented July 2, 1895.

Witnesses
Percy T. Griffith
C. Gerst

Bernhardt A. Gruhl
Inventor
by Edgar Tate & Co
Attorneys

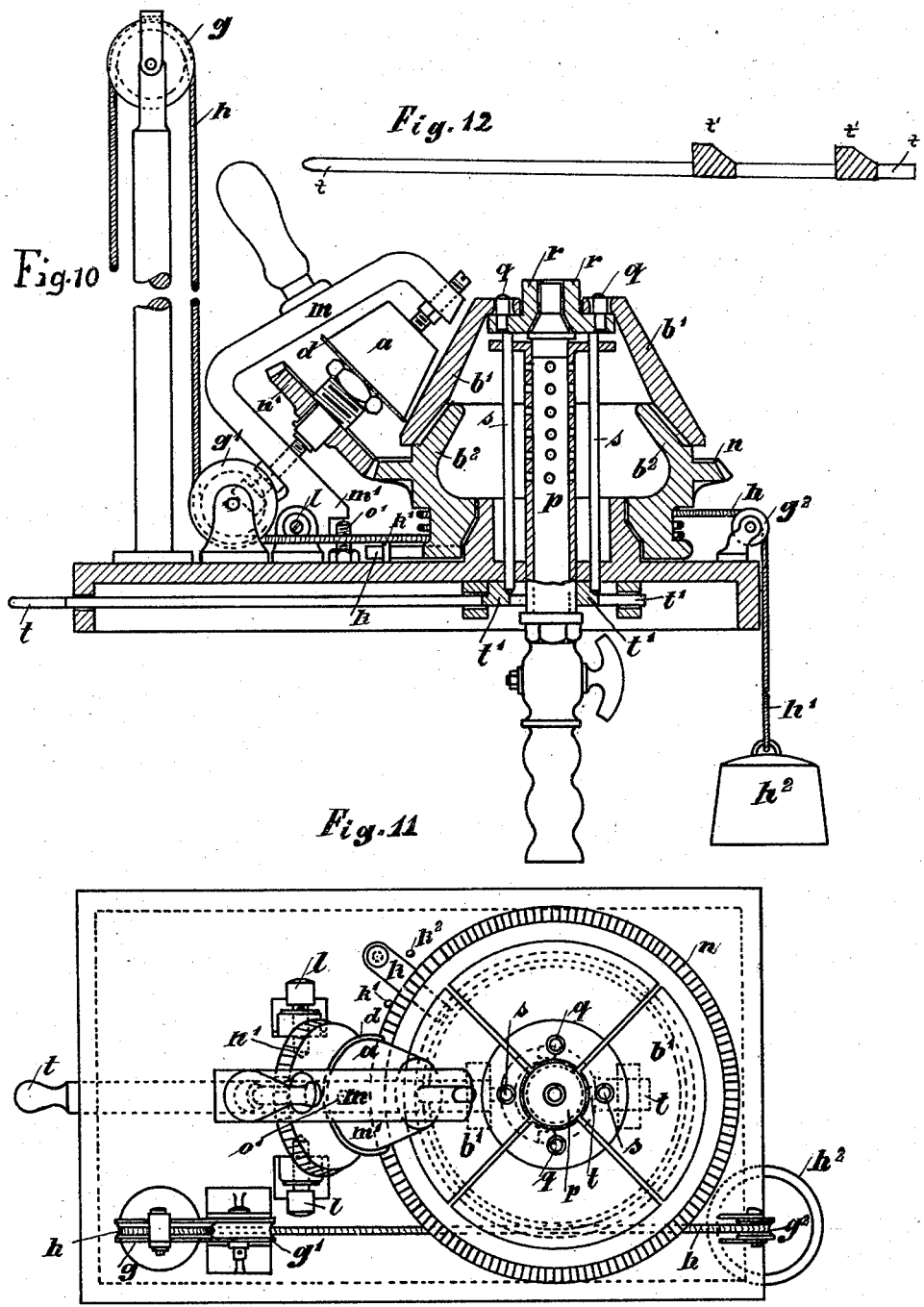

UNITED STATES PATENT OFFICE.

BERNHARD ALWIN GRUHL, OF DRESDEN, GERMANY.

APPARATUS FOR SHAPING DESIGNS ON BLOWN GLASS.

SPECIFICATION forming part of Letters Patent No. 541,851, dated July 2, 1895.

Application filed July 20, 1894. Serial No. 518,112. (No model.)

*To all whom it may concern:*

Be it known that I, BERNHARD ALWIN GRUHL, a subject of the Emperor of Germany, residing at Dresden, in the Kingdom of Saxony, German Empire, have invented certain new and useful Improvements in Apparatus for Shaping, Producing Ornamental Designs on, and Finishing Concave Blown-Glass Objects; and I do hereby declare that the following is a full, clear, and exact description of the invention, which will enable others skilled in the art to which it appertains to use the same.

The object of my invention is to provide a much cheaper method and means than has hitherto existed for shaping, reproducing ornamental designs on, and cutting or smoothing the edges of hollow or concave blown-glass objects, and, by performing in one operation what has heretofore necessitated two or more separate operations, and, moreover, by delivering a better finished article, not only to very considerably reduce the cost of production, but, also, to materially improve the appearance of the product.

My invention consists, essentially, in heating concave blown-glass bodies into a plastic state and then pressing or rolling same into the particular shape or form of object required by means of upper and lower stationary or rotary dies, and, simultaneously with this operation, in imprinting ornamental designs or inscriptions on to, and cutting or smoothing the edges of said object by using upper dies and core correspondingly profiled to the shape of object required, the upper die having sharp knife-like edges or provided at each end with a circular cutter having the shape of the edge required to be cut.

It will be seen from the detailed description of my invention which will hereinafter follow, that the adaptability of my said invention is not restricted to simple forms of objects or decoration. On the contrary, owing to an arrangment whereby I can keep the glass in its soft plastic state for any length of time, any sort of complicated object can be shaped or any inscription or decorative design reproduced on same without the least difficulty, and, moreover, I can use much thinner glass for the purpose than has hitherto been possible.

I will now explain my invention with reference to the accompanying drawings, in which—

Figure 8:
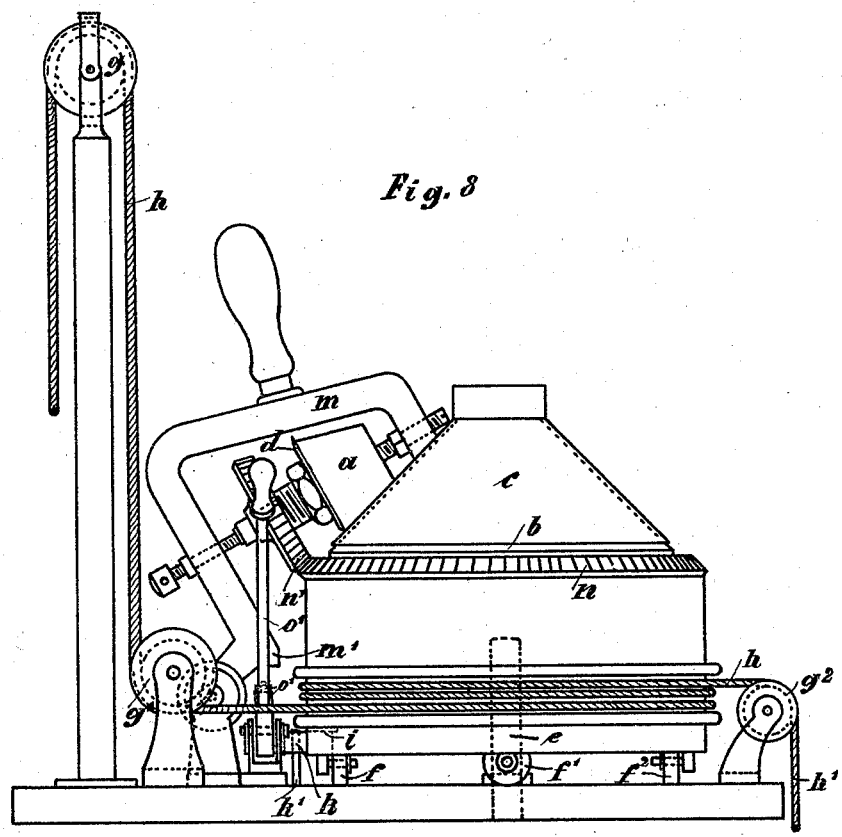
Figure 9:
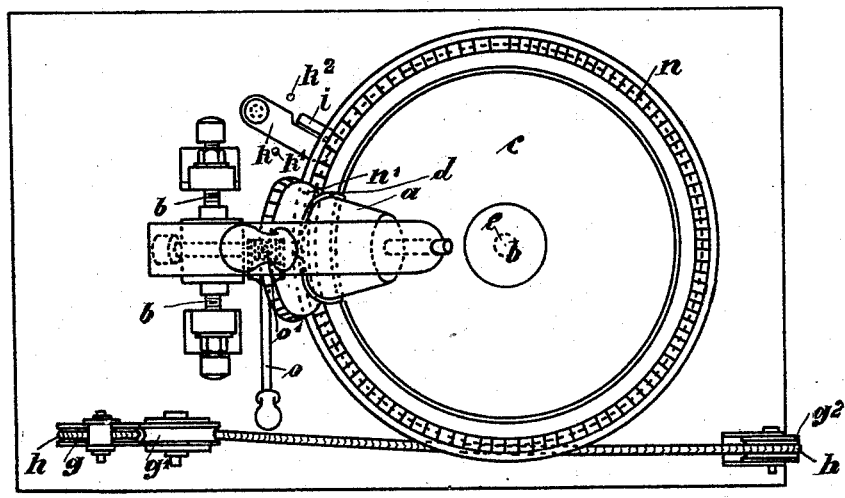

Figures 1 to 4 are part vertical sections of an upper or roller die and a rotary or stationary core or block-die with the side of the object between them. Fig. 5 is a vertical section of object, die and core, showing the manner of forming bell-shaped objects. Figs. 6 and 7 are different forms of circular cutters for cutting the edges of the objects. Fig. 8 is an elevation of the apparatus when the rotary or stationary core or block-die is used in a cold state. Fig. 9 is plan view of Fig. 8. Fig. 10 is a part sectional elevation of the apparatus when a hollow, heated rotary or stationary core or block-die is used. Fig. 11 is a plan view of Fig. 10. Fig. 12 is a detail sectional view of the lever $t$ showing the wedge shaped pieces or shoulders $t'$.

My method consists, essentially, in heating the hollow or concave blown-glass bodies into a more or less plastic state and in then pressing or rolling same into the shape required by means of an upper or roller die and a rotary or stationary core or block-die, and, in simultaneously reproducing any desired decorative design on the object and cutting or smoothing the edges of same by providing, first, the upper or roller die with sharp knife-like edges or circular cutters, and, second, both upper and block-die or core with profiles embossed or recessed on the faces of same in accordance with the embossed or recessed decorative design required. When, for instance, a decorative design is required to be reproduced so as to have an embossed appearance from the outside of the object, and, be recessed on the inner side, or the reverse, an upper or roller die and a block-die or core must be used which have profiles embossed or recessed accordingly. A transparent design can, however, be reproduced by having one of the dies flat and the other recessed or embossed according to the pattern required.

For rapid production, the block-die or core can be used in a cold state, and it will be generally found sufficient to heat the blown-glass body or mass in a soft plastic state with time for manipulation of same into the finished object before the glass sets. When, however, complicated shapes of objects or kinds of decoration are required, I find it preferable to use a hollow core or block-die so arranged as to be heated and kept hot from inside in such way, that the glass can be kept soft and plastic for any length of time required, and, moreover, much thinner glass can be manipulated in this way than has heretofore been possible.

In the case of a hollow core or block, where the glass can be kept soft and plastic, I arrange the face of the block into either vertical or lateral sections, which can be placed in or taken out of the core or block frame without difficulty.

It will be evident from the foregoing that almost any shape or degree of delicacy of object can be made and any decorative design or writing reproduced on same by a skillful use of the dies, and, as the edges of the object can be cut straight or fancy as required, by the use of a suitable cutter, it will be clear, that by uniting these three operations into one operation, I greatly facilitate the rapidity of the production and produce a much more elegant article at considerably less cost than is possible with existing methods, owing to the articles or objects in these latter having to be finished off by hand.

Having now explained my method, I will describe my apparatus for carrying same out.

Referring particularly to the drawings, ($a$) is an upper or roller die, ($b$,) the rotary or stationary core or block-die, ($c$) the object under manipulation, and $d$ and $d'$ circular cutters. From Figs. 1 to 4 it will be seen how variations in the form and decoration of the object are reproduced. For instance, when the decoration on the object is required to appear embossed from outside (Fig. 1) the upper or roller die ($a$) is recessed, while the pattern is embossed on the block-die $b$; or, when the pattern is required to appear recessed from outside, (Fig. 2) the same is embossed on the upper or roller die ($a$), and recessed on the core or block-die ($b$). When merely a transparent pattern is required, it suffices to recess the pattern on one side of the object only, either the upper or roller die ($a$) or the core or block-die ($b$) having an embossed pattern accordingly, while the under or upper die has a perfectly flat face, (Figs. 3 and 4.) Of course the dies may have multitudinous forms besides those shown in the figures.

In producing bell-shaped objects, with or without decorated sides, a core or block-die ($b$) and an upper or roller die ($a$) are used in which both upper and lower dies are narrow above and broaden out toward their bases, the faces of the dies being curved to accord with the outline required. If it be also required to reproduce decorative patterns on said bell-shaped objects, this can easily be done by respectively embossing or recessing the dies accordingly.

When the object has been shaped and, if required, decorated, its edges are left rough, and to smoothen these, a special grinding operation has hitherto been necessary. To perform this operation I make my upper or roller die with sharp knife-like edges, which, in the case of common articles, generally suffice for the purpose required; but I can also employ a combination of circular cutters with my upper or roller die, so as not only to be able to cut the edges cleanly at any angle, but also to cut so-called fancy edges of either angular or curved indentations.

Where the edge of the upper or roller die can engage with the surface of the object at right angles, said edge will be found sufficient to cut same, as will also an ordinary straight edged cutter $d$. In the case of bell-shaped objects, however, I use a cutter $d'$ with a rounded edge. For cutting curved or fancy edges, which, in existing methods is a very tedious operation, I use a circular cutter such as is shown in Fig. 6 or modifications of same to suit modified forms, and, in case the curves be regular, a circular cutter mounted obliquely to its axis will suffice for the purpose.

In the elevation of my apparatus shown in Fig. 5, ($a$) is the upper or roller die, ($b$) the core or block-die, and ($c$) the object under manipulation. In this arrangement an ordinary hollow or solid core or block-die is used in a cold state, and both the upper or roller die ($a$) and the core or block-die ($b$) can each be stationary or rotary on its own axis.

The upper or roller die ($a$) is adjustably mounted in a frame ($m$), Fig. 8, by means of a set-screw the lower part of said frame being hinged on to a pivot ($l$) so that, by means of the handle of the frame, said upper or roller die can be pressed against or raised from the core or block-die as required. Said core or block-die is mounted on a short core spindle or vertical shaft ($e$) so as to rotate on same and runs on rollers ($f$).

In order that the upper or roller die ($a$) may not be pressed too sharply on the plastic glass mass, at the moment when the former first contacts with the latter, the under end of the frame is formed into a nose ($m'$) engaging with a stop-pin $o'$ which can be released by a lever $o$. Said stop-pin $o'$ can be adjusted by means of a set-screw or any other suitable arrangement. I further provide the core or block-die with a circular rack ($n$) with which engages a spur wheel or pinion ($n'$), mounted along with the upper or roller die in the frame ($m$), and which arrangement insures the pressure being uniform on all parts of the surface of the object.

Where it is required to produce objects having complicated forms or decorative designs, I use a core or block-die as shown in sectional elevation in Fig. 10.

Instead of on a short shaft or core spindle, the core or block in Fig. 10 is revolubly mounted on a gas pipe $p$ provided with holes or lateral burners in such way that jets of flame can be directed on the inner sides of said core or block so as to keep same in a heated state.

In order that the object under manipulation may be more readily slipped on and off its bed or core, I adopt the following arrangement: In the first place I divide the upper part of the core or block-die ($b'$) into segments, whose upper ends are pivoted on to bolts ($q$) fastened in the frame ($r$) while their lower ends rest loosely on the oblique upper surface of the lower part of the core or block-die. Supporting the head ($r$) are two vertical rods $s$ which rest on a lever $t$. Said lever $t$ is provided with wedge-pieces or shoulders $t'$ in such way that, by means of the lever ($t$) said wedge-pieces or shoulders ($t'$) can be forced underneath the rods $s$, and, in exerting a wedge-like action on same, force them upward along with the head ($r$) and segments $b'$. The weight of the segments causes them to strive after a vertical position and, consequently, when raised, their circumference becomes less and the article can be slipped off easily.

The mode of operation is as follows: The frame ($m$) containing the upper or roller die ($a$) is pulled over away from the core or block-die ($b$) and the hollow blown-glass body to be shaped is then placed on the latter in a plastic state. The apparatus is then set in motion by means of a cord ($h\ h'$) running over pulleys $g$ and $g'$, slung around the lower part of the core or block-die and connected over pulleys $g^2$ with a weight $h^2$ in such way that the said core or block can be turned in one direction by pulling the cord, while it is returned to its original position in the other direction by the weight $h^2$.

In order to limit the rotary motion of the core or block-die to three hundred and sixty degrees, I attach to same a projection ($i$) engaging in both directions with a piece ($k$) swinging between and alternately engaging with pins $k'\ k^2$.

The upper or roller die can be of any size in proportion to the size of the frame and, as said die need not necessarily be much larger than the dimensions of the design of which it prints the whole or part, it will be evident that a combination of dies can be used.

My idea can be carried out in various other modified forms without departing from the principle of the invention.

Having fully described my invention, what I claim, and desire to secure by Letters Patent, is—

1. In an apparatus for shaping or producing designs on glass articles, the combination of a main frame, a block-die revolubly mounted on said frame, a rack on the block-die, a supplemental frame at one side of the block-die, pivoted to the main frame and carrying a roller-die, and a pinion on the supplemental frame arranged to mesh with the rack on the block-die, and transmit motion to said roller-die from the block-die, substantially as and for the purpose set forth.

2. In an apparatus for shaping or producing designs on glass articles, the combination of a main frame, a block-die revolubly mounted on said frame and having an annular rack thereon, a supplemental frame pivoted to the main frame at one side of the block-die, a roller die carried by said supplemental frame, a pinion on the supplemental frame arranged to mesh with the said rack, and means for adjusting the roller-die in the frame, substantially as described.

3. In an apparatus for shaping or producing designs on glass articles, the combination of a main frame, a block-die revolubly mounted thereon, a supplemental frame pivoted to the main frame and carrying a roller die, a nose formed on the supplemental frame arranged to engage with a stop-pin in the main frame, and means for releasing or adjusting said stop-pin, substantially as described.

4. In an apparatus for shaping or producing designs on glass articles, the combination of a main frame, a hollow block-die mounted on said frame, a tubular shaft or core extending up through the block-die and having a series of openings in its upper end, an annular rack on the block-die, a supplemental frame pivoted to the main frame at one side of the block-die, a roller-die adjustably secured in the supplemental frame, a pinion arranged in the supplemental frame and adapted to engage the rack on the block-die, and means for regulating the pressure of the roller-die on the plastic mass on the block-die, substantially as described.

5. In an apparatus for shaping or producing designs on glass articles, the combination with a main frame, and a block-die mounted thereon of a roller-die adapted to operate on the block-die, and a series of pulleys mounted on said frame and arranged to be operated by a cord and weights to rotate the block-die, substantially as described.

6. In an apparatus for shaping or producing designs on glass articles, a block-die having an integral lower portion and a segmental upper portion, the segments of the upper portion resting loosely on the lower portion, substantially as described.

7. In an apparatus for shaping or producing designs on glass articles, a block-die made in two portions, the upper portion comprising a series of segments resting loosely on the lower portion, and means for operating said segments so that the article may be readily removed from the block-die, substantially as described.

8. In an apparatus for shaping or producing designs on glass articles, a block-die having an integral lower portion and a segmental upper portion, a head carrying the segment of the upper portion, rods secured to said head and extending down through the block-die, and a lever having wedge shaped pieces or shoulders arranged to engage the lower ends of the rods and raise the same, substantially as described.

9. In an apparatus for shaping glass or producing designs on glass articles, the combination of a frame, a hollow block-die mounted thereon, the pin $i$, the piece $k$ and the pins $k'$, $k^2$, substantially as and for the purpose described.

In witness whereof I hereunto set my hand in presence of two witnesses.

BERNHARD ALWIN GRUHL.

Witnesses:
 KURT EUGEN GRUTZNER,
 SAMUEL HULME RHODES.